C. GRAF.
HORSE DETACHER.
APPLICATION FILED OCT. 17, 1914.
1,168,193.
Patented Jan. 11, 1916.
2 SHEETS—SHEET 1.
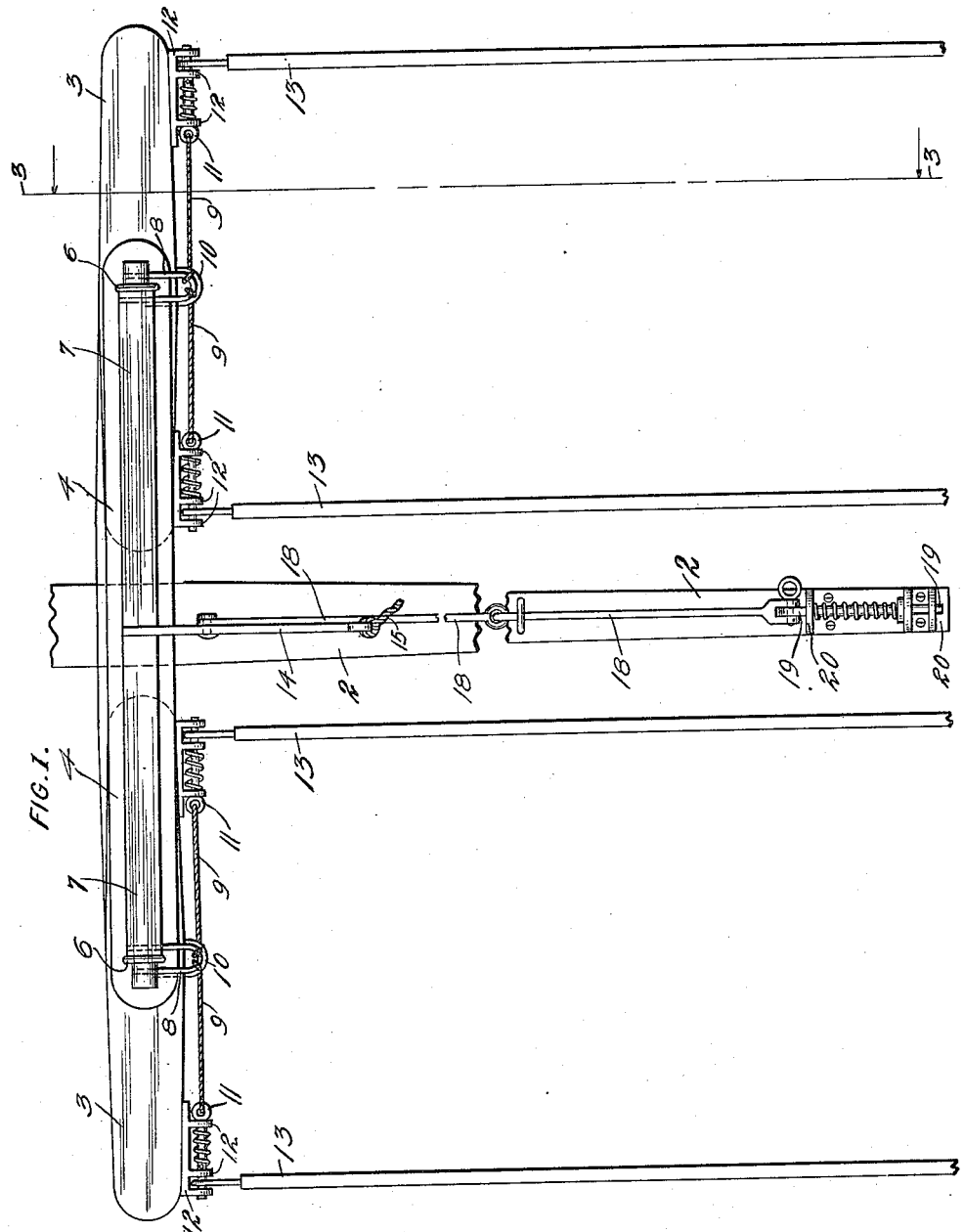
WITNESSES
Paul A. Viersen
Otto Melchior
INVENTOR
C. Graf
BY
ATTY.

C. GRAF.
HORSE DETACHER.
APPLICATION FILED OCT. 17, 1914.
1,168,193.
Patented Jan. 11, 1916.
2 SHEETS—SHEET 2.
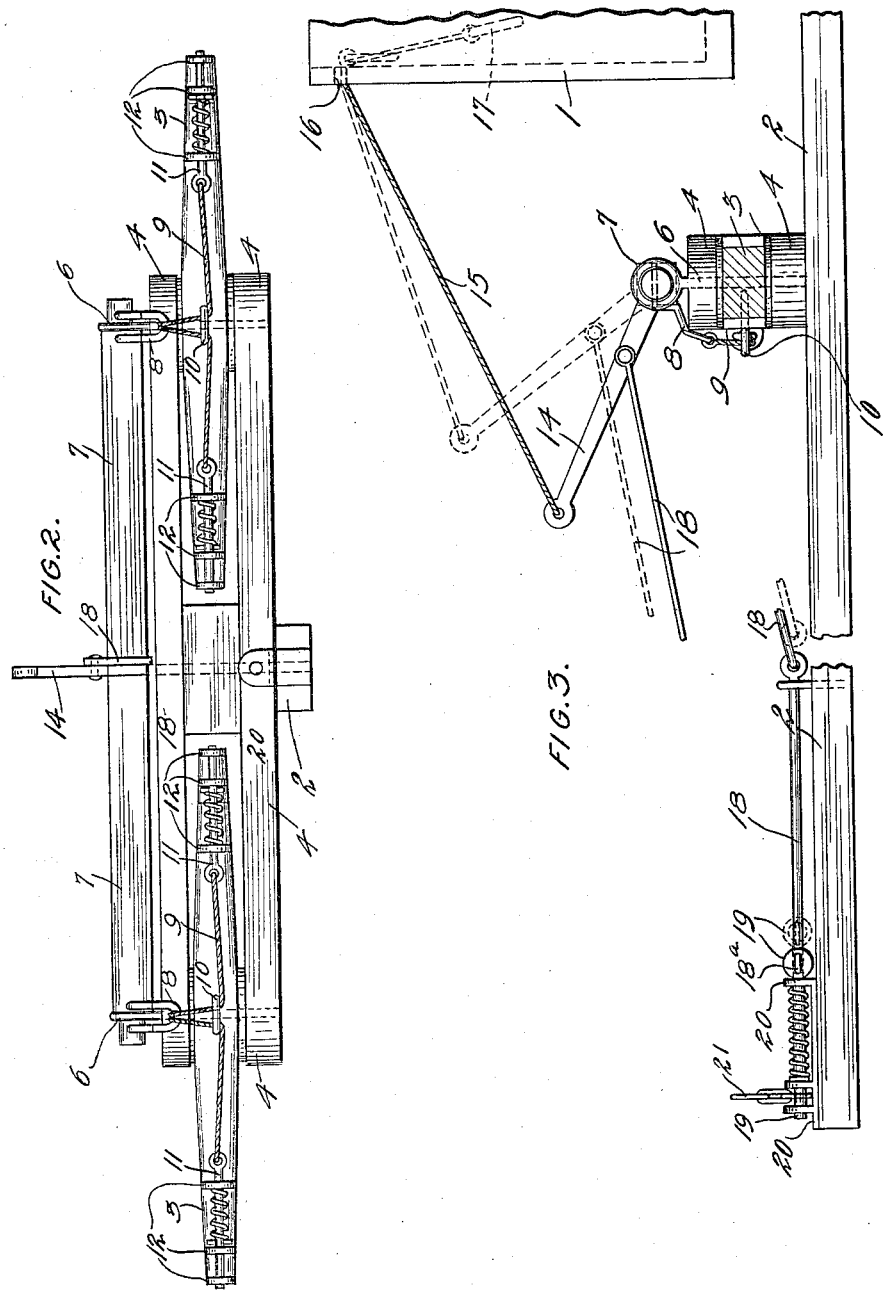
WITNESSES
Paul A. Viersen
Otto Melchior
INVENTOR
C. Graf
H. Sanders
BY                    ATTY.

UNITED STATES PATENT OFFICE.

CHRISTIAN GRAF, OF PAXICO, KANSAS.

HORSE-DETACHER.

1,168,193.  Specification of Letters Patent.  Patented Jan. 11, 1916.

Application filed October 17, 1914. Serial No. 867,135.

*To all whom it may concern:*

Be it known that I, CHRISTIAN GRAF, a citizen of the United States, residing at Paxico, in the county of Wabaunsee and State of Kansas, have invented certain new and useful Improvements in Horse-Detachers, of which the following is a specification.

This invention relates to improvements in means for detaching horses from vehicles and its object is to provide simple and effective means for this purpose.

With the foregoing and other objects in view the invention consists in the combination and arrangement of parts to be hereinafter fully described, pointed out in the claim and illustrated in the accompanying drawings which form a part of said specification and in which—

Figure 1 is a plan view of my device showing its attachment to the tongue and swingletrees of a vehicle. Fig. 2 is a front elevation. Fig. 3 is a side view taken on line 3—3 of Fig. 1.

Like reference characters indicate corresponding parts throughout the several views.

The reference numeral 1 designates a fragmentary portion of the body of a vehicle, 2 is the tongue of the vehicle and 3—3 the swingletrees. The swingletrees 3—3 are supported between the beams 4—4 in the usual manner and through said beams and swingletrees the eye-bolts 6, 6 extend that pivotally carry a rock shaft 7 that extends approximately from the plane of the longitudinal center of one swingletree to the plane of the longitudinal center of the other swingletree and in the ends of said shaft staples 8, 8 are secured, each of which carries a cord 9 that passes through a guide staple 10 carried by each swingletree to engage the spring-pressed draw-bolts 11 carried by brackets 12 secured to each end of each swingletree.

To the rock-shaft 7 a lever 14 is secured which, at its opposite extremity, is engaged by a cord 15 that passes through a transverse aperture 16 in the body of the vehicle and is connected to a hand ring 17 disposed within reach of the driver. The lever 14, further, is connected to a pitman 18 connected by bolt 18ª to a draw-bolt 19 carried by a bracket 20 secured to the front end of the tongue and said draw-bolt releasably carries a chain 21 secured to the harness of the draft animals.

Operation: To release the animals from the vehicle the driver pulls upon the ring 17 which raises the lever 14 into the position shown dotted in Fig. 3 of the drawings thus turning the rock-shaft 7, disengaging the draw-bolts 11 from the tugs, which are thereby dropped from the swingletrees and withdrawing the draw-bolts 19 from engagement with the chain 21 freeing the harness from engagement with the tongue.

What is claimed is:

The combination with the tongue and swingletrees of a vehicle, of a rock-shaft disposed above said swingletrees and extending from approximately the longitudinal center of one swingletree to the longitudinal center of the other swingletree, yieldingly retractable tug-carrying draw-bolts arranged at each end of each swingletree, downwardly bent staples terminally carried by said rock-shaft, guide staples centrally carried by said swingletrees, flexible means carried by the said downwardly turned staples and passing through said guide staples and operatively connected to said draw-bolts whereby the latter may be drawn toward each other as said rock-shaft is actuated; a draw-bolt carried by said tongue and manually operable means for actuating said rock-shaft and the last named drawbolt.

In testimony that I claim the foregoing as my own I have hereto affixed my signature in the presence of two subscribing witnesses.

CHRISTIAN GRAF.

Witnesses:
A. R. STROWIG,
Jos. W. HUND.

Copies of this patent may be obtained for five cents each, by addressing the "Commissioner of Patents, Washington, D. C."